July 27, 1965

R. B. McEUEN 3,197,394

APPARATUS AND METHOD FOR SEPARATING POLARIZABLE
FROM NON-POLARIZABLE PARTICLES

Filed Jan. 2, 1962

INVENTOR.
ROBERT B. McEUEN
BY
Edward H. Lang
ATTORNEY

INVENTOR.
ROBERT B. MCEUEN
BY
Edward H. Fang
ATTORNEY

United States Patent Office 3,197,394
Patented July 27, 1965

3,197,394
APPARATUS AND METHOD FOR SEPARATING POLARIZABLE FROM NON-POLARIZABLE PARTICLES
Robert B. McEuen, Barrington, Ill., assignor to The Pure Oil Company, Chicago, Ill., a corporation of Ohio
Filed Jan. 2, 1962, Ser. No. 163,597
16 Claims. (Cl. 204—186)

This invention relates to an apparatus and method for separating polar and nonpolar particles, either solid or liquid. This invention is especially useful for separating polarizable and nonpolarizable micelles.

Particles which possess no net positive or negative charge may be classified as polar or nonpolar. Polar particles are those, which, though neutral in that they possess no net charge have within the particle areas of positive and negative charge which produce large dipole moments. Polarizable particles are those which have no net charge but come to possess large dipole moments when exposed to the influence of an electric field, and such particles are classified as polar particles in this application. Nonpolar particles have no net electrical charge, have no dipole moment, and exhibit a negligible dipole moment under the influence of intense electric fields.

It is known that materials of differing polarizability can be separated under conditions of dielectrophoresis. Dielectrophoresis is the force felt by polar material when in a non-uniform electric field resulting in the most polar material moving toward the place of greatest field intensity. On pages 1182–1188 of "Journal of Applied Physics," volume 29, number 8, August 1958, H. A. Pohl has explained such a force as arising in the following way. "Any dipole (induced or permanent) will have a finite separation of equal amounts of plus and minus charges in it. The electric field will cause a measure of alignment of the dipole with it. Because the field is non-uniform, one end of the dipole will be in a weaker field than the other. A net force will then result and the dipole will be pulled towards the place of greatest field intensity."

The apparatus and method of this invention are based on the use of the dielectrophoretic force produced by a non-uniform electric field in conjunction with opposing applied centrifugal forces and ultrasonic waves to segregate polar particles from nonpolar particles. Briefly, the apparatus of this invention comprises an ultrasonic means for producing an emulsion of micelles in a liquid of low dielectric constant and low conductivity; means for subjecting the micelles to dielectrophoretic force, the maximum force being applied at the point of micelle production; means for simultaneously subjecting the micelles to a centrifugal force opposite in sense to the dielectrophoretic force; means for varying the frequency of the micelle-producing ultrasound to modulate the micelle size; and means for separating the particles concentrated at different zones in the suspending fluid under the net influence of the opposing forces.

It is an object of this invention to provide an apparatus and method for separating polar and nonpolar particles. Another object of this invention is to provide an apparatus and method for separating polarizable micelles from nonpolarizable micelles. Still another object of this invention is to provide an apparatus and method for separating polar and nonpolar particles under conditions of dielectrophoresis. A further object of this invention is to provide an apparatus and method for separating polar and nonpolar particles under conditions of dielectrophoresis, utilizing centrifugal force and ultrasonic waves. These and further objects of the invention will become apparent as the description herein proceeds and reference is made to the accompanying drawings in which:

More specifically, the apparatus of my invention consists of two cylindrical ultrasonic transducers, one positioned coaxially inside of the other, defining there-between an annular space. The annular space contains a liquid of low dielectric constant and low conductivity, and having a density differing substantially from that of the mixture to be separated, so chosen that the mixture which will be temporarily suspended therein can be readily separated. Also disposed in the annular space is an electrically conductive grid through which the mixture to be separated is introduced into the liquid contained in the annular space. The transducers simultaneously produce ultrasonic pulses of such a nature that they reinforce each other at the intermediate grid and cause the creation of small micelles. The resulting micelles contain mobile charges which, under the influence of an applied electric field, move in a manner to reduce the internal field in the micelles and produce a large dipole movement in the micelles. Consequently, under the influence of the non-uniform electric field in my apparatus, having a maximum intensity at the grid and minimum intensity at the outer transducer, the polar micelles move in the direction of increasing field strength and become concentrated at the point of maximum field strength, viz., the grid. Simultaneously, the separation chamber is rotated about its axis to impose a centrifugal force on the micelles. This centrifugal force is selected so that it is less than the dielectrophoretic force on the polar micelles, but sufficient to cause the nonpolar micelles to move outward from the grid. The micelles then migrate through the suspending fluid into coaxial micelle-receiving tubes disposed adjacent to an end of the separation chamber where the nonpolar micelles are separated from the polar micelles.

It will be apparent that this apparatus and method are useful in making a variety of separations, such as removing salt from seawater. In such use, the sodium and chlorine ions tend to become concentrated in certain of the micelles which are polar. The nonpolar, fresh-water micelles are separated from the polar, salt-containing micelles as described above.

Figure 1:
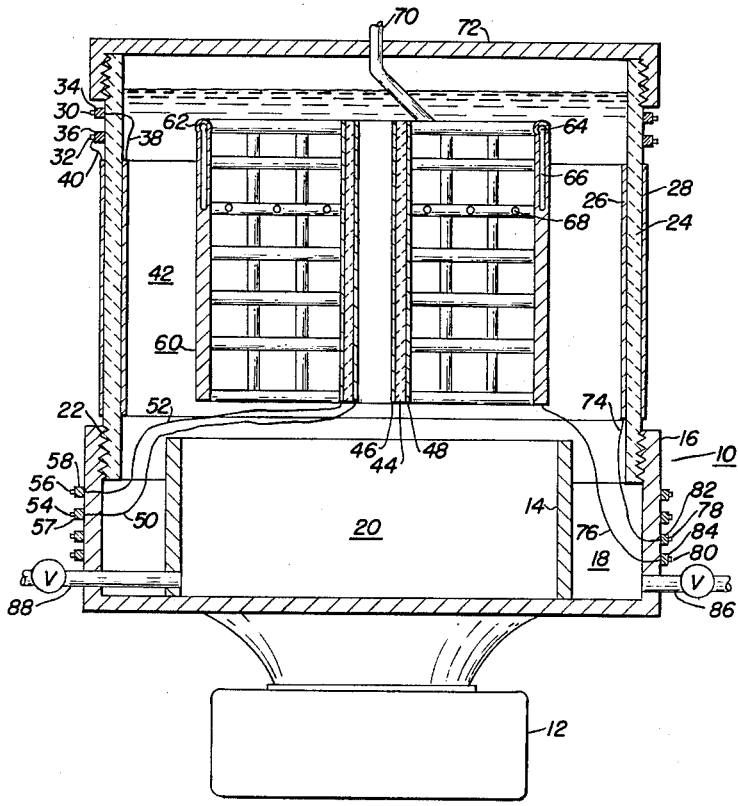
FIGURE 1 is a frontal elevation view, partly in section, of the apparatus of this invention.
Figure 2:
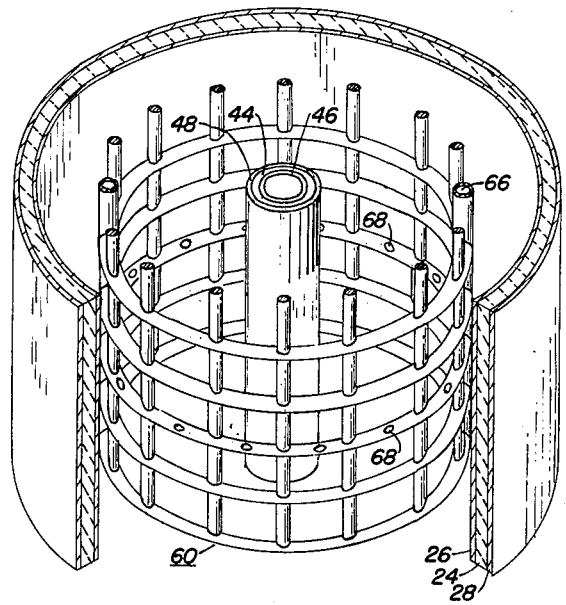
FIGURE 2 is a fragmentary isometric view of the separating chamber employed in the apparatus depicted in FIGURE 1.

For a more complete understanding of my invention, reference is made to FIGURES 1 and 2 in which the numeral 10 depicts a segregating receptacle rotatably supported on housing 12, which housing contains a motor and appropriate gearing for rotating segregating receptacle 10 about a vertical axis. Receptacle 10 contains coaxially mounted tube 14, which, together with shell 16 of segregating receptacle 10, forms two separate receiving reservoirs 18 and 20. Threaded to segregating receptacle 10 at point 22 is cylindrical transducer 24. Cylindrical transducer 24 is provided with electrodes 26 and 28 on the inner and outer surfaces thereof. Slip-rings 30 and 32 are supported by electrically-insulating slip-ring supports 34 and 36, so that slip-rings 30 and 32 are mounted coaxially with respect to segregating receptacle 10 for rotation therewith. Brush means, not shown, make contact with slip-rings 30 and 32 to provide means for transmitting electric pulses through slip-rings 30 and 32 and conductors 38 and 40 to electrodes 26 and 28, to excite transducer 24.

Disposed within cylindrical separating chamber 42 defined by transducer 24 is cylindrical transducer 44. Cylindrical transducer 44 is mounted coaxially with transducer 24 for rotation therewith by means not shown. The inner and outer surfaces of transducer 44 are provided with electrodes 46 and 48, respectively. Electric pulses are transmitted by conductors 50 and 52 to electrodes 46 and 48 in order to excite transducer 44. Conductors 50 and 52 are connected to slip-rings 54 and 56 which are supported by electrically-insulating slip-ring supports 57 and 58.

Also disposed in cylindrical chamber 42 is grid 60 mounted, by means not shown, coaxially with transducers 24 and 44 for rotation therewith. Grid 60, which is of an electrically-conductive material, is so located that ultrasonic waves produced by transducers 24 and 44 will reinforce each other at grid 60. Provided at the top of grid 60 is cylindrical tubular member 62 having passageway 64 therethrough. Passageway 64 connects with passageways 66 in grid 60 which lead to openings 68 into cylindrical chamber 42. Cylindrical member 62 is provided with fluid-inlet line 70 which extends through cover 72 threaded to transducer 24. A high electric potential is applied to electrode 26, being superimposed on the signal to excite transducer 24, and grid 60 by conductors 74 and 76. Conductors 74 and 76 are connected to slip-rings 78 and 80, respectively, which are connected to electrically-insulating slip-ring supports 82 and 84, respectively.

In an operation of the apparatus for desalting seawater, a liquid of low dielectric constant and low conductivity, such as benzene, is introduced into the apparatus until both segregating receptacle 10 and separating chamber 24 are filled to above grid 60. Simultaneously, the apparatus is rotated by means of the electric motor and gearing contained within base 12; a high direct-current potential difference is applied to electrode 26 and grid 60, thereby producing a non-uniform electric field having maximum intensity at grid 60; and a pulse of radio frequency is transmitted to electrodes 26 and 28 to excite transducer 24, and to electrodes 46 and 48 to excite transducer 44, to produce ultrasonic waves. The repetition rate of the pulses transmitted to the electrodes is adjusted so that waves produced by the transducers impinge on the other transducer and aid in the formation of new ultrasonic waves. Sea water introduced into fluid-inlet line 70 emerges through holes 68. The ultrasonic waves produced by ultrasonic transducers 24 and 44 reinforce one another as they propagate past grid 60 to cause the formation of small micelles at grid 60, the size of the micelles being inversely proportional to the frequency of the ultrasonic pulse. The size of the micelles formed will be about equal to one-half the wave length of the ultrasonic waves. For example, a 0.8 mc. pulse will produce micelles about 0.03 inch long. After sufficient time has been provided for the formation of a large number of these micelles, the frequency of the ultrasonic pulse is increased to cause the micelles to undergo a transition. For example, in the case where an initial pulse of 0.8 mc. is utilized, the pulse is tripled to cause the micelles to break into 3 parts and form micelles of a stable size. The transition of the micelles is accomplished by either the end of the micelle which has excess chlorine ions breaking away and taking additional sodium ions to maintain electrostatic neutrality, while the end with the excess sodium is doing the reverse, or the negative and positive ends of the micelles breaking away and forming oppositely charged micelles. A central micelle is formed which is "fresher" than the saline water introduced into the separator. This separation cycle is repeated until the central micelles produced are so nonpolar "fresh" that the centrifugal force on them exceeds the dielectrophoretic force. The dielectrophoretic force on the micelles causes the polar micelles to remain in the vicinity of grid 60 while the nonpolar micelles move toward transducer 24. The polar micelles then accumulate in reservoir 20 and the nonpolar micelles accumulate in reservoir 18. The separated micelles can be removed from reservoirs 18 and 20 through valve-controlled conduits 86 and 88, respectively.

The force applied to the particles being separated by rotation of the apparatus is proportional to the mass of the particles, the distance of a particle from the axis of rotation, and the square of the angular velocity of rotation. Accordingly, as the distance of a particle from the axis of rotation increases, the tendency of a particle to migrate will increase. The force applied to a particle to produce migration is in proportion to the difference in the density of a particle and the suspending fluid. Where the particle and suspending fluid are of the same density, the centrifugal force applied to the particle equals the force applied to an equal volume of suspending fluid, and there is no movement of the particle. Where the density of the particle is greater than that of the fluid, the particle will tend to migrate towards the periphery of the cylindrical separating chamber. Where the density of the particle is less than that of the suspending fluid, the particle will tend to migrate toward the axis of rotation of the separating chamber. In the latter case, it will be evident that the collecting chamber must be located above the separating chamber.

Figure 3:
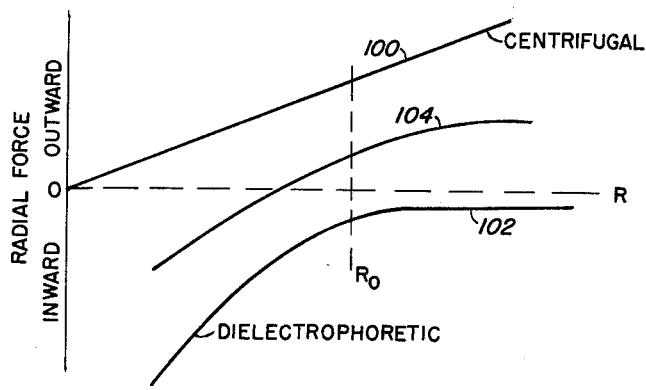
FIGURE 3 is a graph showing the relationship between the centrifugal force and dielectrophoretic force applied to particles at varying radial distances from the axis of rotation of the apparatus depicted in FIGURE 1.

Referring to FIGURE 3, a graph depicting the magnitude of net forces applied to a particle at varying radial distances from the axis of the separating chamber is shown. Curve 100 is a plot of the outward centrifugal force applied to the particle being separated when its density is greater than that of the suspending fluid. When the density of the particles is less than that of the suspending fluid, the force will be opposite in direction. Curve 102 is a plot of the dielectrophoretic force applied to a particle having a total dipole moment differing from that of an equal volume of suspending liquid. The direction of the force is radially inward in sense when the total dipole moment of the particle is greater than that of the suspending fluid, and outward in sense when the total dipole moment of the particle is less than that of an equal volume of the suspending fluid. Curve 104 is a plot of the net force applied to the particle under the influence of the applied centrifugal and dielectrophoretic forces. $R_o$ represents the radial distance from the axis of rotation.

While the transducers may be fabricated from monocrystalline piezoelectric crystals, such as Rochelle salt, quartz, etc., it is preferred that they be of polycrystalline piezoelectric materials which have greater strength than monocrystalline piezoelectric materials. In general, polycrystalline piezoelectric elements are composed of a polycrystalline piezoelectric material, such as a metallic titanate, or mixtures thereof combined with a ceramic binder, and fired. Examples of metals from which the polycrystalline metallic titanates are derived are barium, strontium, magnesium, manganese, lead, and zirconium. The electrodes are thin films of a suitable electrically-conductive material, such as silver or gold, which are secured to the transducers, as by cementing or vacuum deposition.

Although the grid can be fabricated of any electrically-conductive material, platinum is preferably utilized in view of the variety of materials that can be separated using a platinum grid as compared with a grid of another electrically-conductive material. The openings through the grid are large enough so that the grid will not interfere to any great extent with the ultrasonic waves passing through it, that is, so the grid will not break the ultrasonic waves passing through it. Preferably, the ratio of the openings in grid 60 to the wave length of the ultrasonic waves produced by transducers 24 and 44 is of the order of ten to one. The openings 68 to cylindrical chamber 42 are preferably located from segregating receptacle 10 at a distance at least one-half the height of grid 60 since the nonpolar particles simultaneously migrate outwardly from the axis of rotation and downwardly. It is also preferred that openings 68 be spaced from the top of grid 60 since the ultrasonic waves and electric field are nonuniform near the top of grid 60. For obvious reasons, it is preferred that the grid does not contain any passageways below the openings leading to the cylindrical separating chamber.

The suspending fluid can be any liquid of low conductivity, such as chlorothene, carbon tetrachloride, benzene, white oil, etc., having a density and dielectric constant substantially different from that of the particle being separated. The potential gradient between the grid and the wall of the cylindrical separating chamber may vary over a wide range, that is, from about 10,000 volts/cm. to breakdown. A voltage within the range of about 500 to 1,500 volts, and a frequency within the range of 500 kc. to 10 kmc. is required to excite the transducers to produce the required ultrasonic pulses. The frequency of the ultrasonic pulses will vary depending upon the specific material being separated and the size of the micelles to be formed.

Although this invention has been described in relation to specific embodiments, it will be apparent that modifications can be made by one skilled in the art without departing from the intended scope of the invention. For example, the apparatus may be used for separating solid particles having sizes in the range of about 1 to 10 microns diameter without the utilization of ultrasonic pulses. Any number of secondary grids can be utilized to produce a discontinuous dielectrophoretic field in order to allow selectivity with respect to the total moments of the particles being separated. The apparatus can be used to modify any micelle or molecule which is large with respect to both the wave length of the ultrasonic wave, and the non-uniformity of the electric field, provided these two forces are of sufficient strength. Long-chain polymers can be broken into smaller chains, having differing total dipole moments, which then can be separated. Miscible molecules of sufficient size, such as acrylate or methacrylate resins (which can be of the order of 1 micron) dissolved in chlorothene, can be separated from one another because of the polar nature of the resin molecule and the nonpolar nature of the chlorothene solvent.

The embodiments of this invention in which an exclusive property or privilege is claimed are defined as follows:

1. An apparatus for separating polarizable particles from nonpolarizable particles, comprising a cylindrical chamber, means for supporting said chamber for rotation about a vertical axis, means for rotating said chamber, a tubular grid axially disposed within said chamber and spaced from the cylindrical wall of said chamber, electrode means for propagating a non-uniform electric field having a maximum intensity near said grid, means for conducting electric potential to said electrode means, transducer means for converting electric pulses into transmitted ultrasonic waves having the maximum intensity near said grid, means for transmitting electric pulses to said transducer means, and means for introducing the mixture to be separated in said chamber and withdrawing the separated mixture from said chamber.

2. An apparatus in accordance with claim 1 including a plurality of coaxial particle-receiving tubes disposed adjacent to an end of said chamber, coaxially therewith, for receiving separated particles.

3. An apparatus in accordance with claim 2 in which at least a portion of said grid and the cylindrical wall of said chamber are of electrically-conductive materials, and said means for conducting electric potential is connected to apply potential between said grid and cylindrical wall.

4. An apparatus in accordance with claim 3 in which said grid is disposed between first and second transducer means adapted to transmit ultrasonic waves toward said grid and reinforce each other near said grid.

5. An apparatus in accordance with claim 4 in which said cylindrical wall is one of said transducer means.

6. An apparatus in accordance with claim 5 including means for introducing fluent material into said chamber from said grid.

7. An apparatus in accordance with claim 6 in which said grid includes a plurality of vertically spaced circular elements, and a plurality of spaced vertical elements intersecting said circular elements.

8. An apparatus in accordance with claim 7 in which at least a portion of said circular and vertical elements are of tubular cross-section; the longitudinal passageways in said tubular, circular elements intersecting the longitudinal passageways in said tubular, vertical elements, thereby forming a conduit within said grid; and said grid includes openings between said conduit and chamber and means for introducing fluent particles into said conduit.

9. An apparatus in accordance with claim 8 in which said openings between said conduit and chamber are located from said particle-receiving tube at a distance of at least one-half the height of said grid.

10. An apparatus in accordance with claim 9 in which said openings between said conduit and chamber are spaced from the end of said grid remote from said particle-receiving tubes.

11. An apparatus in accordance with claim 10 in which said grid is platinum.

12. A method for separating a fluent mixture according to polarizability comprising suspending said mixture in a non-conductive fluid having a dielectric constant and density differing substantially from that of said mixture; mildly centrifuging the mixture-fluid suspension while subjecting the suspension to the effect of a non-uniform electric field having a maximum field intensity coaxial with the axis of centrifugal force imposed on said suspension and decreasing in intensity as said field extends radially outward from said axis of centrifugal force, and to the effect of ultrasonic waves having a maximum intensity substantially at said maximum field intensity; and collecting components of said mixture at the locations of maximum and minimum intensity of said field.

13. A method in accordance with claim 12 in which said mixture is of higher dipole moment and density than an equal volume of fluid, and polar components of said mixture are collected at the zone of maximum field intensity.

14. A method in accordance with claim 12 in which said mixture is of lower dipole moment and density than an equal volume of said fluid, and nonpolar components of said mixture are collected at the zone of minimum field intensity.

15. A method in accordance with claim 12 in which the volume of particle-fluid suspension exposed to said field and ultrasonic waves is cylindrical in shape, and said mixture is introduced into said mixture-fluid suspension between the ends of said mixture-fluid suspension.

16. A method in accordance with claim 12 in which micelles are formed in said non-conductive fluid by said ultrasonic waves, after which the frequency of said ultrasonic waves is increased to modualte the micelle size.

References Cited by the Examiner

UNITED STATES PATENTS

| | | | |
|---|---|---|---|
| 2,535,700 | 12/50 | Searey | 104—154 |
| 2,738,172 | 3/56 | Speiss | 204—154 |
| 2,742,408 | 4/56 | La Porte | 204—154 |
| 2,992,979 | 7/61 | Magnuson | 204—180 |

FOREIGN PATENTS

| | | |
|---|---|---|
| 702,811 | 1/54 | Great Britain. |
| 751,735 | 7/56 | Great Britain. |

OTHER REFERENCES

Scientific American, vol. 203, No. 6, December 1960, pp. 106–116.

JOHN H. MACK, *Primary Examiner.*

WINSTON A. DOUGLAS, *Examiner.*